(12) United States Patent
Sakaue et al.

(10) Patent No.: US 8,559,101 B2
(45) Date of Patent: Oct. 15, 2013

(54) REFLECTOR AND APPARATUS INCLUDING THE REFLECTOR

(75) Inventors: Mika Sakaue, Osaka (JP); Mitsuhiko Kimoto, Nara (JP); Kazuaki Ohkubo, Osaka (JP); Yuriko Kaneko, Nara (JP)

(73) Assignee: Panasonic Corporation, Osaka (JP)

( * ) Notice: Subject to any disclaimer, the term of this patent is extended or adjusted under 35 U.S.C. 154(b) by 1719 days.

(21) Appl. No.: 11/718,123

(22) PCT Filed: Aug. 10, 2006

(86) PCT No.: PCT/JP2006/315836
§ 371 (c)(1),
(2), (4) Date: Apr. 27, 2007

(87) PCT Pub. No.: WO2007/023691
PCT Pub. Date: Mar. 1, 2007

(65) Prior Publication Data
US 2009/0046356 A1  Feb. 19, 2009

(30) Foreign Application Priority Data
Aug. 26, 2005 (JP) ................................ 2005-245601
Sep. 8, 2005 (JP) ................................ 2005-260115

(51) Int. Cl.
*G02B 5/26* (2006.01)
*G02B 17/06* (2006.01)
*G02B 17/00* (2006.01)

(52) U.S. Cl.
USPC .................... 359/361; 126/92 A; 126/92 AC; 126/91 R; 126/92 B; 431/326; 431/100; 359/359; 359/360

(58) Field of Classification Search
USPC ...................... 126/92 B, 91 R, 92 A, 92 AC; 431/326–329, 100; 359/359–361
See application file for complete search history.

(56) References Cited

U.S. PATENT DOCUMENTS

| | | | | |
|---|---|---|---|---|
| 2,946,510 A | * | 7/1960 | Galvin | 237/70 |
| 3,217,701 A | * | 11/1965 | Gerhart | 126/92 B |
| 3,310,102 A | * | 3/1967 | Trombe | 165/133 |
| 3,445,662 A | * | 5/1969 | Langley | 250/504 R |

(Continued)

FOREIGN PATENT DOCUMENTS

| | | |
|---|---|---|
| JP | 61-223703 | 10/1986 |
| JP | 02-282689 | 11/1990 |

(Continued)

OTHER PUBLICATIONS

International Search Report for corresponding Application No. PCT/JP2006/315836 mailed Nov. 7, 2006.

(Continued)

*Primary Examiner* — Steven B McAllister
*Assistant Examiner* — Daniel E Namay
(74) *Attorney, Agent, or Firm* — Renner, Otto, Boisselle & Sklar, LLP

(57) ABSTRACT

A reflective plate 72 is arranged so as to reflect infrared rays, radiated from a heating wire 71, outside of a heater 70 and may be made of steel. A number of cavities 73 are arranged on the surface of the reflective plate 72. Since the cavities 73 have an aspect ratio of 0.17 to 0.7, the infrared reflectance can be increased compared to a reflector with no cavities.

12 Claims, 12 Drawing Sheets

(56) References Cited

U.S. PATENT DOCUMENTS

| | | | |
|---|---|---|---|
| 4,023,119 A * | 5/1977 | Danielewicz, Jr. | 372/108 |
| 4,111,762 A * | 9/1978 | Wade et al. | 205/208 |
| 4,589,972 A * | 5/1986 | Pompea et al. | 205/205 |
| 4,727,854 A * | 3/1988 | Johnson | 126/92 B |
| D312,125 S * | 11/1990 | Epner et al. | D23/386 |
| 5,079,473 A | 1/1992 | Waymouth | |
| 5,239,406 A * | 8/1993 | Lynam | 359/275 |
| 5,584,117 A * | 12/1996 | Lee et al. | 29/620 |
| 5,629,521 A * | 5/1997 | Lee et al. | 250/338.1 |
| 5,923,464 A * | 7/1999 | Braun | 359/350 |
| 6,201,242 B1 * | 3/2001 | Eden et al. | 250/332 |
| 6,525,874 B2 * | 2/2003 | Yamawaki | 359/361 |
| 6,687,051 B1 * | 2/2004 | Wang et al. | 359/361 |
| 6,812,626 B2 * | 11/2004 | Perlo et al. | 313/316 |
| 6,832,608 B2 * | 12/2004 | Barkai et al. | 126/653 |
| 6,902,791 B2 * | 6/2005 | Kawasato et al. | 428/141 |
| 6,927,899 B2 * | 8/2005 | Daigle | 359/350 |
| 7,135,698 B2 * | 11/2006 | Mitra | 257/21 |
| 2002/0154406 A1 * | 10/2002 | Merrill et al. | 359/498 |
| 2004/0089807 A1 * | 5/2004 | Wada et al. | 250/338.1 |
| 2004/0108461 A1 * | 6/2004 | Mitra | 250/339.02 |
| 2004/0108564 A1 * | 6/2004 | Mitra | 257/442 |
| 2004/0229187 A1 * | 11/2004 | Bretscher et al. | 433/30 |
| 2005/0122269 A1 * | 6/2005 | Frazier | 343/703 |
| 2005/0178967 A1 * | 8/2005 | Nakaki et al. | 250/339.04 |
| 2006/0037327 A1 * | 2/2006 | Saito et al. | 62/6 |
| 2006/0060784 A1 * | 3/2006 | Moon et al. | 250/338.1 |
| 2006/0071582 A1 | 4/2006 | Sakaue et al. | |
| 2006/0132014 A1 | 6/2006 | Horiuchi et al. | |
| 2006/0163990 A1 * | 7/2006 | Huizar et al. | 313/113 |
| 2006/0207590 A1 * | 9/2006 | Levin | 126/651 |

FOREIGN PATENT DOCUMENTS

| | | |
|---|---|---|
| JP | 07-043526 | 2/1995 |
| JP | 07-084098 | 3/1995 |
| JP | 07-091863 | 4/1995 |
| JP | 08-014764 | 1/1996 |
| JP | 2002-365249 | 12/2002 |

OTHER PUBLICATIONS

Co-pending U.S. Appl. No. 10/541,924, filed Jul. 11, 2005. (Corresponds to U.S. 2006/0132014; current claims provided).

Co-pending U.S. Appl. No. 11/251,944, filed Oct. 17, 2005. (Corresponds to U.S. 2006/0071582; current claims provided).

* cited by examiner (a)

(b)

REFLECTOR AND APPARATUS INCLUDING THE REFLECTOR

TECHNICAL FIELD

The present invention relates to a reflector that reflects infrared rays and to an apparatus including such a reflector. As used herein, the "reflector" refers to a member with the function of reflecting infrared rays. The reflector may be used as a reflective plate that surrounds a heat source inside a furnace such as a reflective plate for a heater, a reflective sheet to reflect infrared rays, or as a curtain or car body with the effect of reflecting infrared rays.

BACKGROUND ART

Infrared reflectors are used in various applications and preferably have as high reflectance as possible. In a heater that uses a heating wire or a halogen lamp, an infrared ray, radiated from the heating wire or the halogen lamps, is reflected by the reflective plate to irradiate the object. If the reflectance of this reflective plate can be increased, the object can be irradiated with the infrared ray with higher efficiency. Also, if the infrared ray contained in a sunray falling on houses can be reflected efficiently by an inexpensive reflective plate, the increase in room temperature inside the houses in summer can be reduced, thus cutting down the power dissipated by air conditioning systems and eventually saving the power rates.

An infrared reflector for heaters and so on may be a reflective plate made of aluminum, for example. As an infrared reflector to be attached to glass, a multilayer infrared reflective film is known.

Patent Document No. 1 discloses a reflective structure that is shaped as a mesh of a metal compound. FIG. 14 illustrates the configuration of the reflective structure disclosed in Patent Document No. 1. The reflective structure shown in FIG. 14 includes a glass base 1 and an infrared reflector 2 arranged on the glass base 1. The infrared reflector 2 is made of a metal compound and has a number of substantially square holes 3. Each side of the holes 3 is defined to be approximately half as long as the shortest wavelength of the infrared rays to be reflected (which will be referred to herein as an "infrared cut wavelength"). That is why infrared rays, of which the wavelengths are equal to or longer than the infrared cut wavelength, are reflected by the reflective structure without passing through the holes 3 of the reflective structure. Those holes 3 function as a waveguide for radiations that have shorter wavelengths than the infrared cut wavelength (e.g., visible radiation). Consequently, visible radiation is not reflected from the reflective structure but transmitted through the holes 3.

Patent Document No. 1: Japanese Patent Application Laid-Open Publication No. 7-43526 (see Paragraphs #0016 and #0023 and FIG. 1, in particular)

Patent Document No. 2: U.S. Pat. No. 5,079,473

DISCLOSURE OF INVENTION

Problems to be Solved by the Invention

The reflective structure disclosed in Patent Document No. 1 can reflect infrared rays with any desired wavelength but its reflectance is not sufficiently high.

In order to overcome the problems described above, the present invention has an object of providing a reflector that can reflect infrared rays at a significantly higher reflectance and also providing an apparatus including such a reflector.

Means for Solving the Problems

A reflector according to the present invention reflects infrared rays. The reflector has a reflective surface with a plurality of cavities. Each of those cavities has an aspect ratio of 0.17 to 0.7.

In one preferred embodiment, each of those cavities has a cylindrical shape, and the aspect ratio of the cavity is figured out by dividing the depth of the cavity by the diameter thereof.

In another preferred embodiment, the side and bottom surfaces of each of those cavities are made of a metal.

In still another preferred embodiment, at least the reflective surface of the reflector is made of a metal.

In yet another preferred embodiment, the metal is tungsten or nickel.

In yet another preferred embodiment, the reflector is a flexible sheet.

In yet another preferred embodiment, a layer that defines the reflective surface is backed with a resin layer.

In yet another preferred embodiment, the cavity has an aspect ratio of 0.3 to 0.4.

A furnace according to the present invention includes a container, a heat source that surrounds the container, and a reflector according to any of the preferred embodiments of the present invention described above. The reflective surface of the reflector is opposed to the heat source.

In one preferred embodiment, the reflective surface reflects an infrared ray, radiated from the heat source, toward the container.

In another preferred embodiment, the furnace further includes an exhaust pump that is connected to the container.

In still another preferred embodiment, the reflective surface of the reflector is a layer including tungsten and carbon.

Effects of the Invention

The reflector of the present invention has a reflective surface with a plurality of cavities having an aspect ratio of 0.17 to 0.7. As will be described in detail later, when the aspect ratio of the cavities was adjusted to such a relatively small value, infrared rays, of which the wavelengths exceeded a particular wavelength determined by the aperture size of the cavities, were reflected at a reflectance of almost 100%. Nobody has ever reported such a phenomenon and the present inventors have not yet figured out exactly how it works. Nevertheless, a reflector with such a significantly increased infrared reflectance should be able to be used effectively in various applications.

Figure 1:
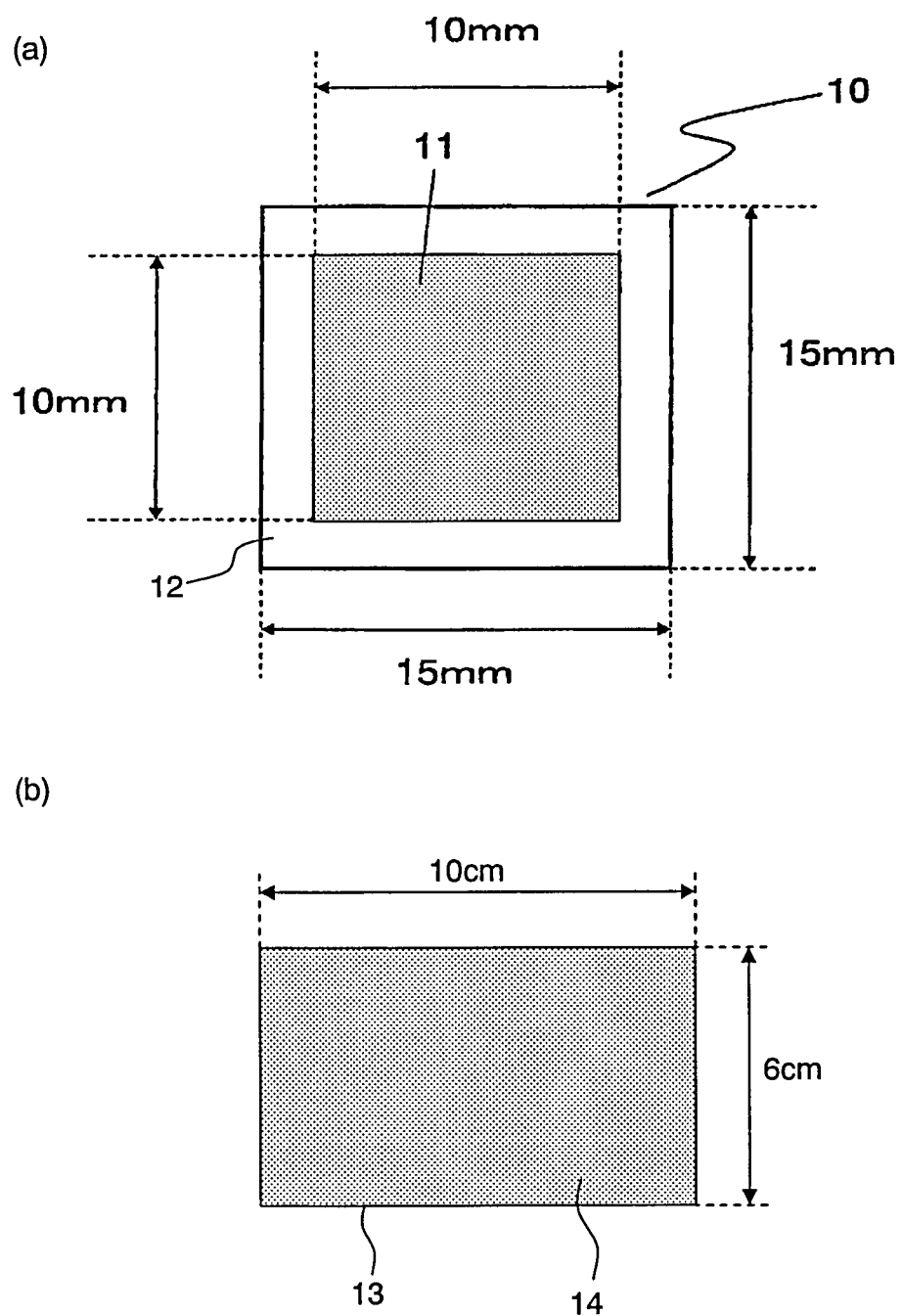
FIG. 1(*a*) is a top view of a first reflector 10 and FIG. 1(*b*) is a top view of a second reflector 13.

DESCRIPTION OF REFERENCE NUMERALS 10, 13 reflector
11, 14 cavity portion
21, 22, 73, 81 cavity
90 furnace
91 container
92 heat source
93 reflective plate
94 heat insulator
95 exhaust pump

BEST MODE FOR CARRYING OUT THE INVENTION

Researches have been carried on to use a structure, having a lot of very small recesses (cavities) arranged on the surface of an object, as a "radiator" for a light source (see Patent Document No. 2, for example). As used herein, the "radiator" is a structure that generates heat as Joule heat, for example, and radiates an electromagnetic wave that has a wavelength distribution varying with the temperature. The filament of an incandescent lamp is a typical example of such a radiator.

Patent Document No. 2 provides a theoretical description of how those microcavities on the surface of the radiator function as a waveguide for electromagnetic waves, of which the wavelengths are shorter than a critical wavelength (which is termed a "cutoff wavelength") determined by the size of the cavities, and significantly reduces the radiation of electromagnetic waves, of which the wavelengths are equal to or longer than the cutoff wavelength.

One of major obstacles that prevent a conventional visible radiation source such as an incandescent lamp from achieving high luminous efficacy is that the radiator cannot convert thermal energy into visible radiation without radiating a lot of infrared rays, of which the wavelengths are too long to sense with human eyes. According to Patent Document No. 2, however, the radiation of infrared rays can be decreased by cutting a lot of cavities on the surface of the radiator. For that reason, by using such a radiator as a filament for an incandescent lamp, its luminous efficacy could be increased by leaps and bounds.

The present inventors actually made such a structure having a plurality of cavities on the surface just like the radiator described above and carried out experiments to measure its reflectance at the surface. As a result, the present inventors discovered that the reflectance depended heavily on the aspect ratio of the cavities. And we also discovered that when the aspect ratio was defined in the range of 0.17 to 0.70, the resultant infrared reflectance was higher than that of an object with no cavities.

In the prior art (see Patent Document No. 2, for example), the inside diameter of cavities on the surface of the radiator is set to be approximately 350 nm in order to define the cutoff wavelength, while the depth of the cavities should be much greater than the inside diameter and may be 7,000 nm (=7 μm), for example. In that case, the aspect ratio is approximately 20. However, the present inventors discovered and confirmed via experiments that the smaller the aspect ratio, the more effectively the infrared rays could be radiated and reflected.

Hereinafter, experiments carried out by the present inventors to measure the reflectance and their results will be described first, and then preferred embodiments of a reflector according to the present invention will be described.

Experiments to See how Reflectance Increases by Adjusting Aspect Ratio

FIG. 1(a) is a top view of a first reflector 10, which is a nickel (Ni) plate with a length of 15 mm, a width of 15 mm and a thickness of 0.1 mm. On the upper surface of the reflector 10, arranged are a cavity portion 11 and an area 12 surrounding the cavity portion 11. The cavity portion 11 has dimensions of 10 mm square and a number of cavities are arranged periodically all over the cavity portion 11. The cavity portion 11 will be described in detail later.

FIG. 1(b) is a top view of a second reflector 13, which is a tungsten (W) plate with a length of 6 cm, a width of 10 cm and a thickness of 0.1 mm. A cavity portion 14 covers the entire surface of the reflector 13 and a number of cavities are arranged all over the cavity portion 14. The cavity portion 14 will also be described in detail later.

Figure 2:
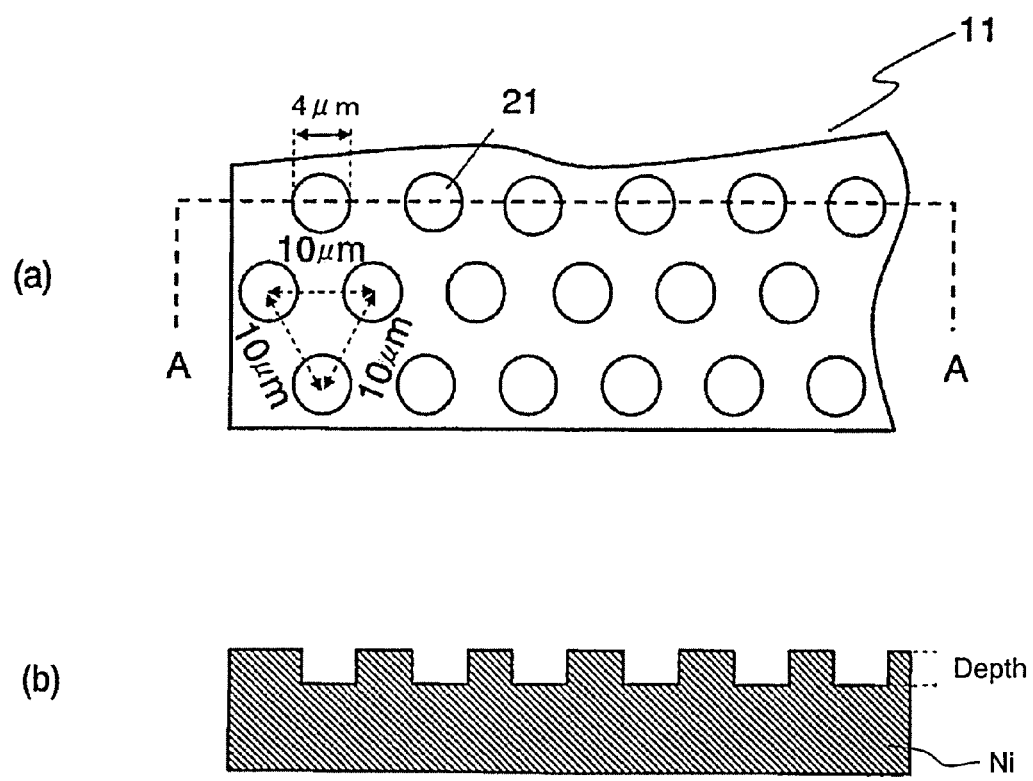
FIG. 2(*a*) illustrates the cavity portion 11 on a larger scale and FIG. 2(*b*) is a cross-sectional view thereof as viewed on the plane A-A shown in FIG. 2(*a*).

Next, the cavity portion 11 shown in FIG. 1(a) will be described with reference to FIG. 2, in which FIG. 2(a) illustrates the cavity portion 11 on a larger scale and FIG. 2(b) is a cross-sectional view thereof as viewed on the plane A-A shown in FIG. 2(a).

In this experiment, each cavity 21 had a cylindrical shape and a diameter of approximately 4 μm. A number of cavities that were adjacent to each other were arranged such that the interval between their axes of rotation was approximately 10 μm.

The present inventors made five types of sample reflectors, of which the cavities 21 had mutually different aspect ratios. As used herein, the "aspect ratio" of each cavity 21 is figured out by dividing the depth of the cylindrical cavity 21 by the diameter thereof, i.e., the ratio of cavity depth to cavity diameter. The cavities 21 of these Samples (1) through (5) had aspect ratios of 0.3, 0.4, 0.7, 2.4 and 9.5, respectively.

It should be noted that these sample reflectors could be made by any of various fine patterning process techniques. In this experiment, the samples were made by an LIGA (Lithographie Galvanoformung Abformun) process in which a mold is made by an X-ray lithographic process and then the samples are formed by an electroforming process. The surface structure of the samples may be processed by being irradiated with a pulsed laser beam. A method of forming very small recesses on the surface of a workpiece by irradiating it with a pulsed laser beam is described in Japanese Patent Application Laid-Open Publication No. 2001-314989, for example.

The reflectances of these five sample reflectors were measured at wavelengths of 2.5 µm to 25.0 µm using a Fourier transform infrared spectrometer (FT-IR) called "EasiDiff FT-IR Spectrometer". As used herein, the "reflectance" is a value showing how much light an object can reflect at what wavelength.

Figure 3:
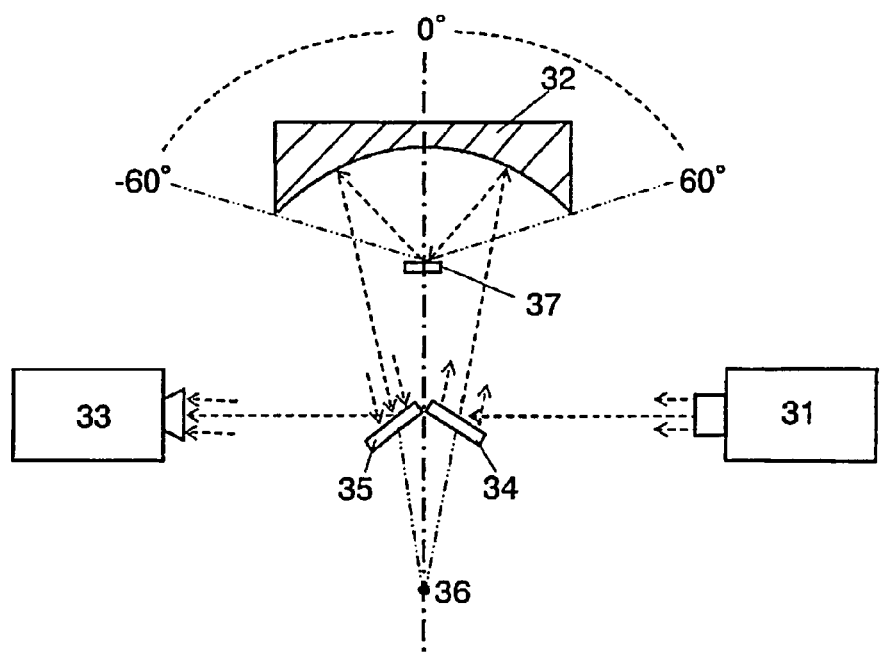
FIG. 3 schematically shows the arrangement of an optical system for an FT-IR.

First, the FT-IR that was used for measurements will be described with reference to FIG. 3, which schematically shows the arrangement of an optical system in the FT-IR. The FT-IR includes a light source section 31, an integrating elliptical reflective mirror 32 and a detecting section 33. The integrating elliptical reflective mirror 32 has two focal points. A sample stage 37, to which the reflector 10 is attached, is arranged at a first focus position. The second focus position 36 is more distant from the reflective surface of the integrating elliptical reflective mirror 32 than the first focus position is.

On the line that connects the reflective surface of the integrating elliptical reflective mirror 32 and the second focus position 36 together, arranged are mirrors 34 and 35 for the light source section and the detecting section, respectively. Supposing a line extended perpendicularly from the center of the sample stage 37 defines 0 degrees, the integrating elliptical reflective mirror 32 has such a size as to define an elevation angle range of +60 degrees to −60 degrees.

Next, it will be described how to measure the reflectance with the FT-IR. The light emitted from the light source section 31 is reflected from the mirror 34 for the light source section and then incident on the integrating reflective mirror 32. The incoming light is reflected by the integrating reflective mirror 32 and then condensed on the sample stage 37 at the first focus position. The condensed light enters the cavity portion 11 of the reflector 10 attached to the sample stage 37. As a result, only a part of the incoming light, of which the wavelength is equal to or longer than a particular wavelength determined by the cavities 21, is reflected.

The reflected light is incident on the integrating reflective mirror 32 again, reflected from the integrating reflective mirror 32 toward the second focus position, and then reflected by the mirror 35 for the detecting section. Eventually the reflected light enters the detecting section 33, where the wavelength of the incoming light is measured.

The reflectance of the reflector 10 with an aspect ratio of 0.3 was measured with an FT-IR having such an arrangement. The results will be described below. As a reference, the reflectance of a comparative sample, which was different from the sample only in having no cavity portion 11 (i.e., a nickel plate), was also measured.

Figure 4:
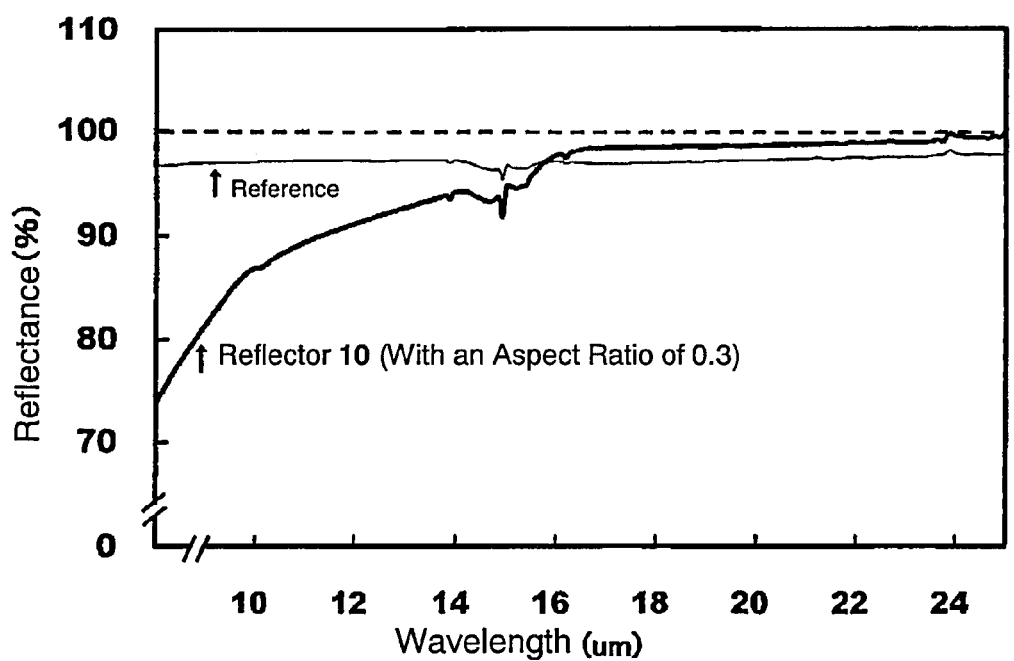
FIG. 4 shows the reflectances that were measured on a reflector 10 (made of Ni).

FIG. 4 shows the reflectances that were measured on the reflector 10 (made of Ni) with cavities. In FIG. 4, the abscissa represents the wavelength (µm) and the ordinate represents the reflectance (%).

As can be seen from FIG. 4, as for radiations with wavelengths of less than about 16 µm, the reflectance of the reflector 10 was lower than that of the reference. That is why it can be seen that as far as radiations in such a wavelength range were concerned, the reflectance decreased by providing the cavities.

On the other hand, when the wavelength was equal to or longer than about 16 µm, the reflectance of the reflector 10 was higher than that of the reference. More specifically, as the wavelength was gradually increased from about 16 µm, the reflectance of the reflector 10 increased, too. And when the wavelength was about 24 µm or more, the reflector 10 had a reflectance of 99% or more (i.e., almost 100%).

These results reveal that when the wavelength was equal to or longer than about 16 µm, the reflectance of the reflector 10, having cavities with an aspect ratio of 0.3, was higher than that of the reference with no cavities. Particularly as the wavelength of the radiations went farther beyond about 16 µm, the reflectance of the reflector 10 came closer and closer to 100%. And when the wavelength was equal to or longer than about 24 µm, the reflectance of the reflector 10 reached almost 100%.

It should be noted that the cavities 21 for use in this experiment had as small a diameter as 4 µm. That is why these results could have been brought about by a significant difference in surface roughness between the reflector 10 and the reference, not by the presence of the cavities 21 with such an aspect ratio. To clear up this point, the surface roughness of the reference and that of the non-cavity portions of the reflector 10 (i.e., the surface portions between the cavities 21 shown in FIG. 2(a)) were measured with an atomic force microscope (AFM). As a result, we discovered that the difference in roughness between these samples was approximately one-tenth of the cavity diameter (i.e., about 0.4 µm), which had no significant effect on the result of measurements by the FT-IR. In this manner, the present inventors confirmed that the beneficial effect achieved by the reflector 10 with an aspect ratio of 0.3 shown in FIG. 4 was brought about by the configuration of the cavities 21.

Figure 5:
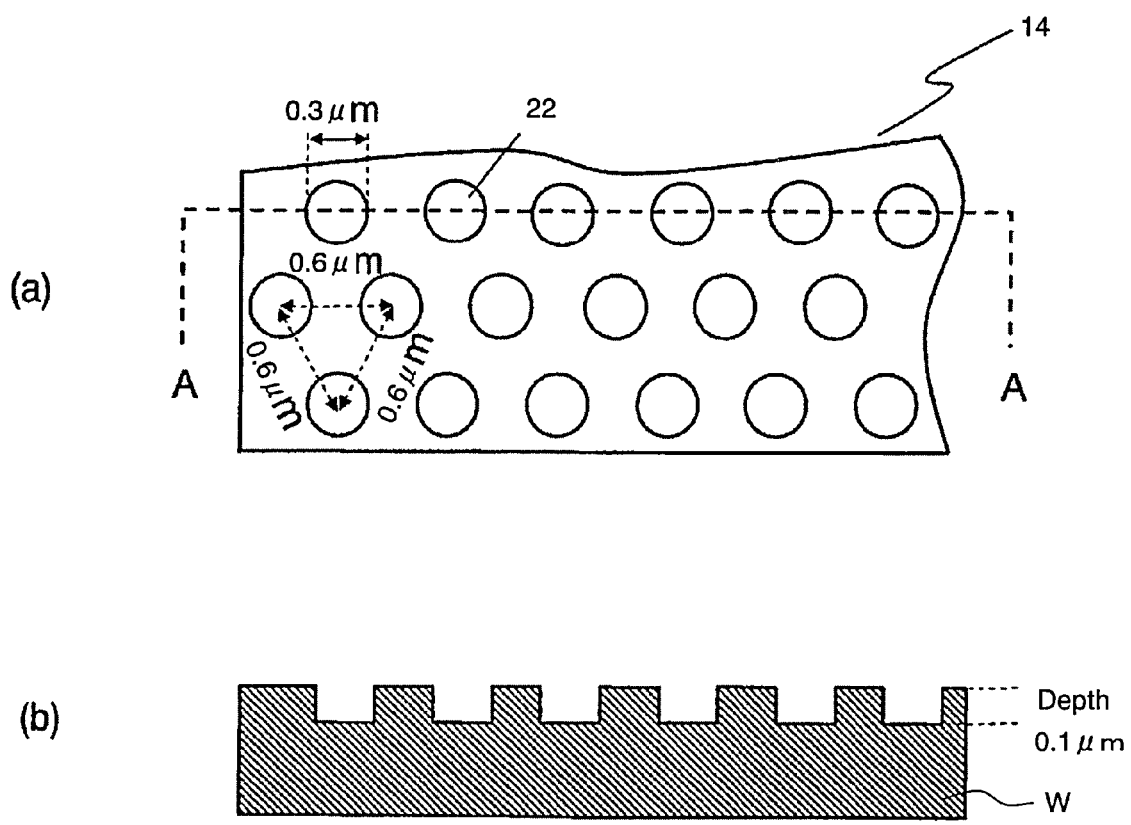
FIG. 5(*a*) illustrates the cavity portion 14 on a larger scale and FIG. 5(*b*) is a cross-sectional view thereof as viewed on the plane A-A shown in FIG. 5(*a*).

Next, the results of experiments carried out on a reflector having the cavity portion 14 shown in FIG. 1(b) will be described with reference to FIG. 5, in which FIG. 5(a) illustrates the cavity portion 14 on a larger scale and FIG. 5(b) is a cross-sectional view thereof as viewed on the plane A-A shown in FIG. 5(a).

In the cavity portion 14, nearly cylindrical cavities 22 were arranged substantially periodically as an array. Each cavity 22 had a cylindrical shape and a diameter of 0.3 µm. A number of adjacent cavities were arranged such that the interval between their axes of rotation was approximately 0.6 µm. The cavities had a depth of 0.1 µm. Therefore, the cavities 22 had an aspect ratio (i.e., the cavity depth/cavity diameter ratio) of approximately 0.33. Those cavities 22 were made just as already described with reference to FIGS. 2(a) and 2(b). As a reference, the reflectance of a sample with no cavity portion 14, i.e., a tungsten plate, was also measured.

Figure 6:
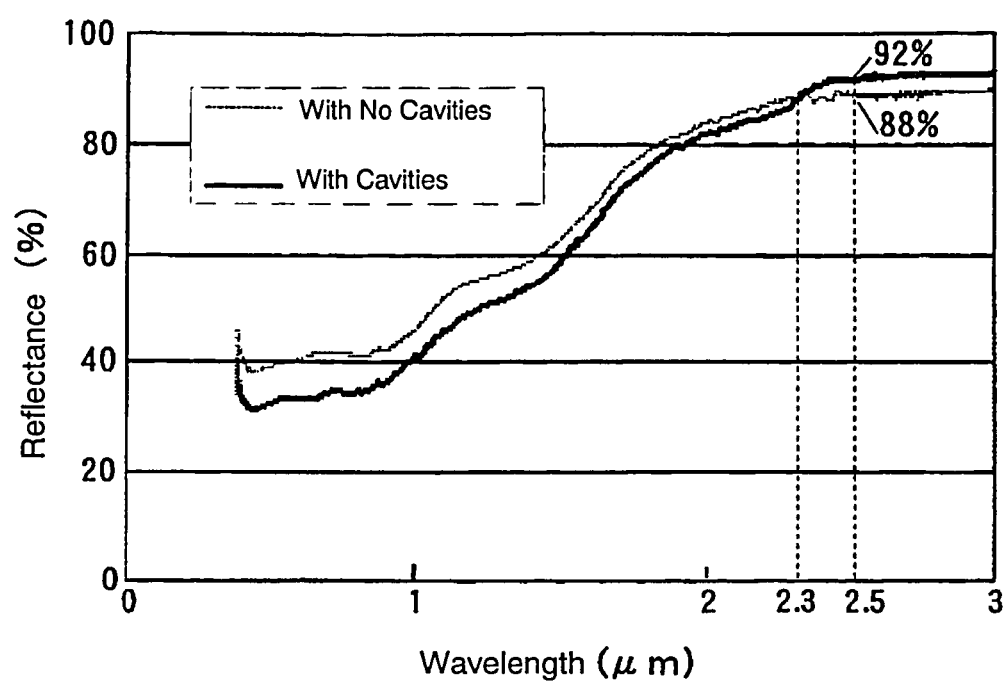
FIG. 6 shows the reflectances that were measured on a reflector 10 (made of W).

FIG. 6 is a graph showing the reflectances that were measured on the reflector 13 made of tungsten. In FIG. 6, the abscissa represents the wavelength (µm) and the ordinate represents the reflectance (%). The reflectances were measured at wavelengths of 0.4 µm to 3 µm.

As shown in FIG. 6, in the visible radiation range, the reflectance of the reference was higher than that of the reflector 13. However, the longer the wavelength, the narrower the difference in reflectance between them. For a radiation with a wavelength of about 2.3 µm, the difference in reflectance between these reflectors went approximately zero. And once the wavelength exceeded 2.3 µm, the reflectance of the reflector 13 became higher than that of the reference. For example, at a wavelength of 2.5 µm, the reference had a reflectance of 88%, while the reflector 13 had a reflectance of 92%.

According to these results of measurement, the sample with the cavities 22 showed an infrared reflectance that was 4% higher than the sample with no cavities. In other words, the sample with the cavities 22 could reflect more thermal radiations that had come from the heat source with wavelengths of 2.3 µm or longer. The present inventors confirmed that these two samples had surface roughness values that were sufficiently smaller than the size of the cavities 22.

Figure 7:
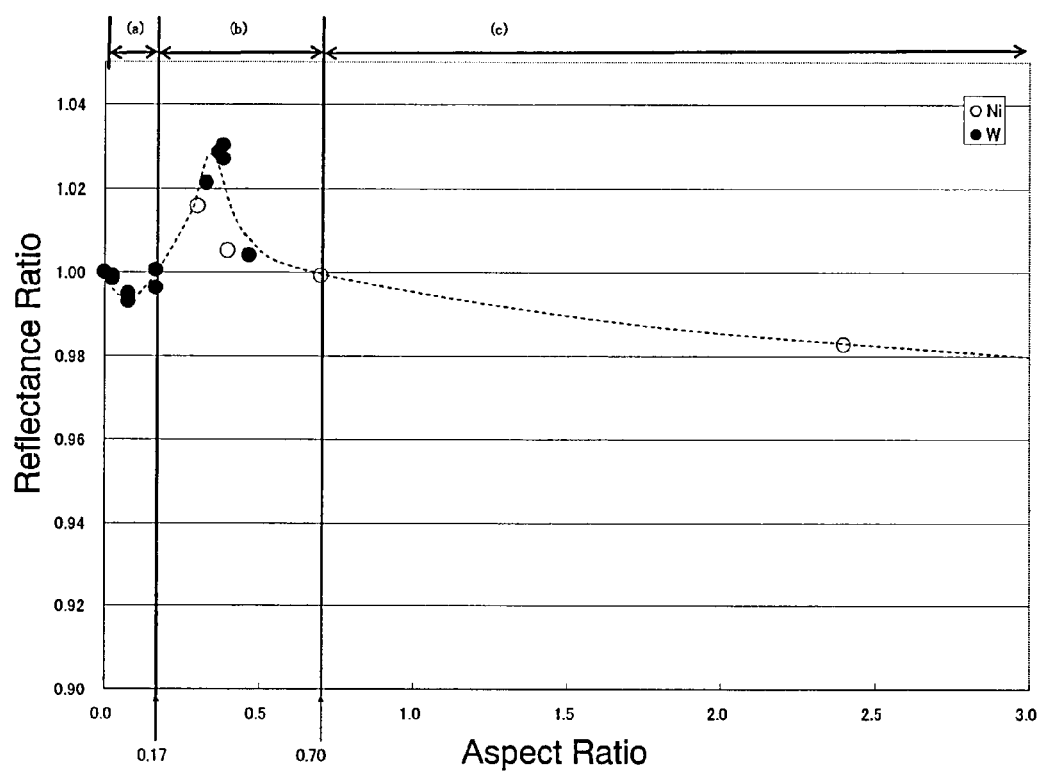
FIG. 7 shows how the infrared reflectance increase rate varies with the aspect ratio of the cavities 21 or 22.

FIG. 7 shows how the infrared reflectance increase rate varies with the aspect ratio of the cavities 21 or 22. In FIG. 7, the abscissa represents the aspect ratio and the ordinate represents the reflectance increase rate, which is calculated by dividing the reflectance of a reflector at a wavelength of 17 μm by that of the reference. If the reflectance increase rate exceeds one, then the reflectance of the reflector is higher than that of the reference. In the graph shown in FIG. 7, the open circles ○ are data points showing the results of measurements on the reflector 10 with the cavities 21 while the solid circles ● are data points showing the results of measurements on the reflector 13 with the cavities 22.

As can be seen from FIG. 7, in the range (b) in which the aspect ratio is from 0.17 through 0.7, the reflectance increase rate exceeds one. On the other hand, in the range (a) in which the aspect ratio is from 0 through approximately 0.17 and in the range (c) in which the aspect ratio exceeds 0.70, the reflectance increase rate is less than one. That is why unless the aspect ratio of the cavities were defined within the range (b), the infrared reflectance of the reflector would not be higher than that of the reference, thus making the presence of the cavities meaningless.

According to the graph shown in FIG. 7, if the aspect ratio is defined within the range of 0.3 to 0.4, the reflectance increase rate will reach its maximum value of more than approximately 1.02. For that reason, the aspect ratio is preferably defined within that range of 0.3 to 0.4.

Results on Variation in Cavity Interval with Skin Depth

In the reflectors 10 and 13 shown in FIGS. 1(a) and 1(b), the infrared rays are reflected by the cavity structure, and therefore, the interval between the cavities is preferably as narrow as possible. That is to say, it is preferable to make as many cavities as possible in the portions of the reflectors 10 and 13 corresponding to the reflective surfaces. It is already known that it depends on the material of the reflective surface to have the cavities (i.e., the skin depth of the reflective surface) whether the cavities can be arranged so densely or not (see Japanese Patent Application Laid-Open Publication No. 3-102701, for example).

And the magnitude of the skin depth is determined by that of the conductivity. That is to say, the higher the conductivity of a material, the shorter the skin depth thereof. First, the skin depths of the respective materials of the reflector 10 were measured. The measurements were done on the three samples of:

(1) a p-type silicon substrate with a boron concentration of $10^{15}$ cm$^{-3}$ (which will be referred to herein as "silicon");
(2) a p-type silicon substrate with a boron concentration of $10^{20}$ cm$^{-3}$ (which will be referred to herein as "doped silicon"); and
(3) tungsten.

A plurality of cylindrical cavities, having a diameter of 250 nm and a depth of 100 nm (i.e., an aspect ratio of 0.4), were arranged at an interval of 500 nm between the axes of rotation of adjacent cavities on these samples, which had been formed by a chemical etching process. The reflectances were measured by a spectrophotometer (Polychrometer MCPD 7000 manufactured by Otsuka Electronics Co., Ltd.) that could carry out measurements at a wavelength in the vicinity of the wavelength of visible radiation.

The present inventors measured the reflectances with wavelengths increased gradually. As a result, we discovered that the reflectance of the tungsten sample started to increase at a wavelength of around 700 nm but that the reflectance of silicon or doped silicon did not increase. These results can be explained from the standpoint of skin depth.

Figure 8:
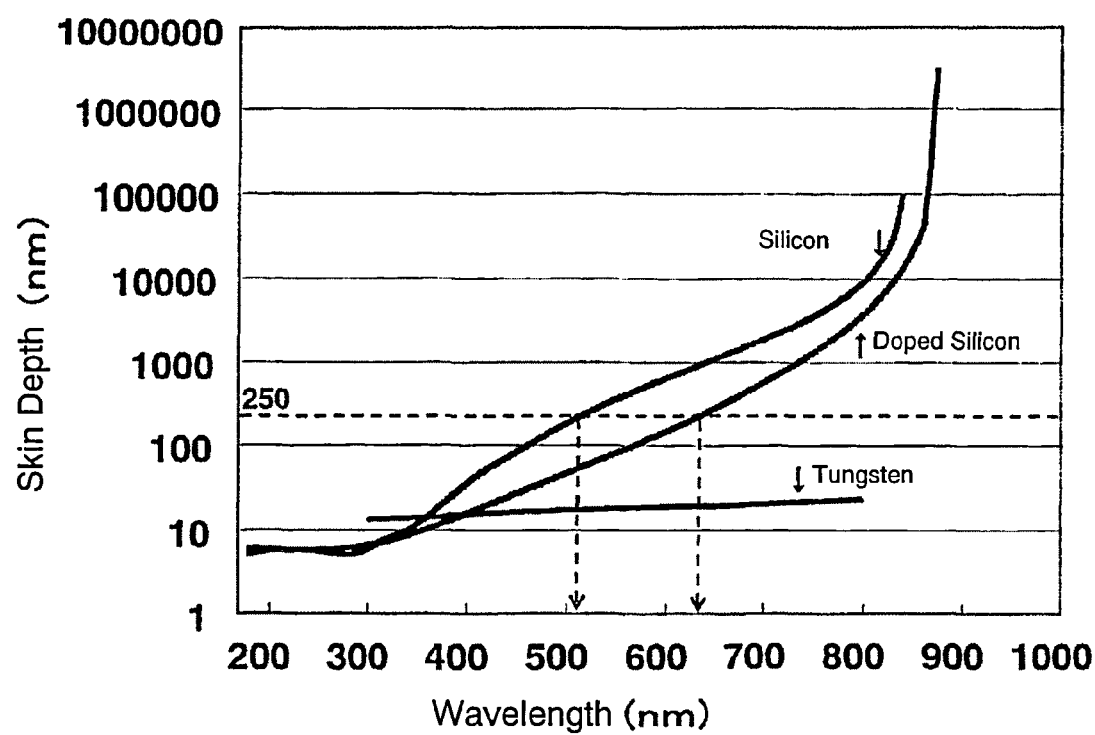
FIG. 8 is a graph showing the results of simulations that were carried out to see how the skin depths of the three types of samples varied with the wavelength.

FIG. 8 is a graph showing the results of simulations that were carried out to see how the skin depths of the three types of samples varied with the wavelength. In FIG. 8, the abscissa represents the wavelength (nm) and the ordinate represents the skin depth (nm). The skin depth δ (nm) is calculated by the following Equation (1):

$$\delta = \lambda/4\pi\kappa \quad (1)$$

where λ is the wavelength (nm) and κ is the imaginary part of the complex permittivity of the material.

In these samples, the narrowest interval between the cavities is 250 nm. That is why if radiations (including ultraviolet rays, visible radiation and infrared rays), of which the wavelengths are associated with skin depths that are greater than 250 nm, entered the reflector, then the ability of the cavities to reflect those radiations would decrease significantly. That is to say, in the samples with the cavity structure, silicon would have significantly decreased ability to reflect radiations with wavelengths of approximately 500 nm or more and the doped silicon would have significantly decreased ability to reflect radiations with wavelengths of approximately 630 nm or more.

These results reveal that the interval between the cavities should exceed the length determined by the wavelength of the radiation to reflect and the skin depth of the reflector.

Furthermore, κ of the skin depth is also affected by the conductivity of the material. That is to say, the higher the conductivity, the shorter the skin depth tends to be. For example, silicon has a conductivity of 10 $(\Omega\cdot m)^{-1}$, doped silicon has a conductivity of $10^5$ $(\Omega\cdot m)^{-1}$, and tungsten has a conductivity of $2.0\times10^7$ $(\Omega\cdot m)^{-1}$. This relation between the conductivity and the skin depth can be roughly confirmed by reference to FIG. 8, too. On the other hand, nickel has a conductivity of $1.3\times10^7$ $(\Omega\cdot m)^{-1}$ and the skin depth curve of nickel is present between the curves of doped silicon and tungsten shown in FIG. 8.

Consequently, by making the reflectors 10 and 13 of a material with a short skin depth (i.e., with a high conductivity), the interval between the cavities can be narrowed and the ratio of the sum of the areas of the cavities to the entire cavity portion (i.e., the aperture ratio) can be increased.

The reflectors 10 and 13 are preferably made of a metallic material. This is because a metal has high conductivity and a short skin depth, and therefore, realizes a higher aperture ratio. It should be noted that if radiations, of which the wavelengths are sufficiently longer than the skin depth, should be reflected, then a material associated that wavelength could be selected. For example, a semiconductor such as doped silicon may be selected.

Alternatively, the materials may be changed depending on the application of the reflector. For example, if the reflector is made of tungsten with a melting point of 3,000 K or more, the reflector can be used even in a high-temperature atmosphere. On the other hand, if the reflector is not supposed to be used at such elevated temperatures, then the reflector may be made of a steel including nickel, for example. An appropriate material may be selected depending on the price of the material.

Optionally, the cavity portion may be divided into a plurality of sections in which the cavities are arranged at mutually different densities. Then, the reflection characteristic would vary with the location on the cavity portion (or on the reflector). The cavities may have any arbitrary inside diameter or depth by modifying the mask.

Why Aspect Ratio Influences Reflectance

The aspect ratio of the cavities should have a significant effect on the reflectance for the following reasons.

First, due to the cutoff phenomenon produced by the cavities, the entrance of light waves into the cavities is limited at wavelengths that are longer than the cutoff wavelength. As a result, the effective volume V at which induced current flows decreases and the loss can be reduced effectively. Next, although the effective volume V at which induced current flows decreases, the electric field E (i.e., the induced current) will be concentrated on the edge portion surrounding each cavity, thus increasing the loss.

In these two contradictory effects, the magnitude of the loss is proportional to the square of the electric field E, and therefore, the increase in loss due to the concentration of the electric field E has greater effect than the decrease in loss due to the decrease of the effective volume V. And the present inventors confirmed that the greater the aspect ratio, the more noticeable this tendency.

Figure 9:
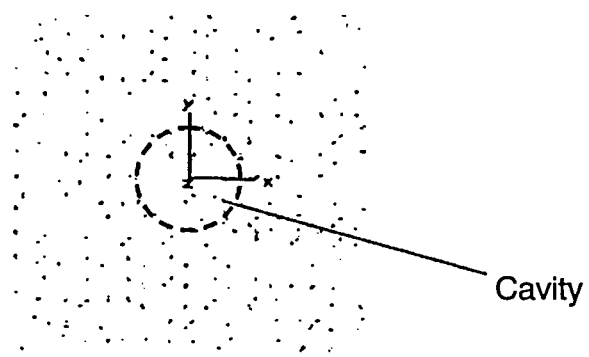
FIGS. 9(a) and 9(b) show the results of simulations on electric fields that would be generated when light with a wavelength of 17.0 μm was incident perpendicularly onto surfaces having cavities with mutually different aspect ratios.
Figure 9:
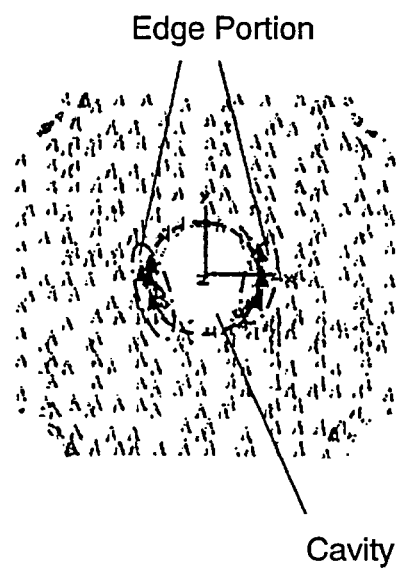

FIGS. 9(a) and 9(b) show the results of simulations on electric fields that would be generated when light with a wavelength of 17.0 μm was incident perpendicularly onto two reflective surfaces having cavities with mutually different aspect ratios. Specifically, FIG. 9(a) shows an example in which the aspect ratio is 0.30 and FIG. 9(b) shows an example in which the aspect ratio is 1.00. In FIGS. 9(a) and 9(b), each triangle indicates the electric field generated, the size of the triangle indicates the strength of the electric field, and the vertex of the triangle indicates the direction of the electric field.

According to the results of these simulations, it can be seen that in the example in which the aspect ratio is 0.30 as shown in FIG. 9(a), even if the wavelength of 17 μm is longer than the cutoff wavelength, some of the light waves enter the respective bottoms of the cavities to generate electric fields. As a result, less induced current is concentrated on the edge portions surrounding the cavities.

On the other hand, in the example in which the aspect ratio is 1.00 as shown in FIG. 9(b), no electric fields are generated in the cavities due to the cutoff effect but more electric fields are concentrated on the edge portions surrounding the cavities.

Figure 10:
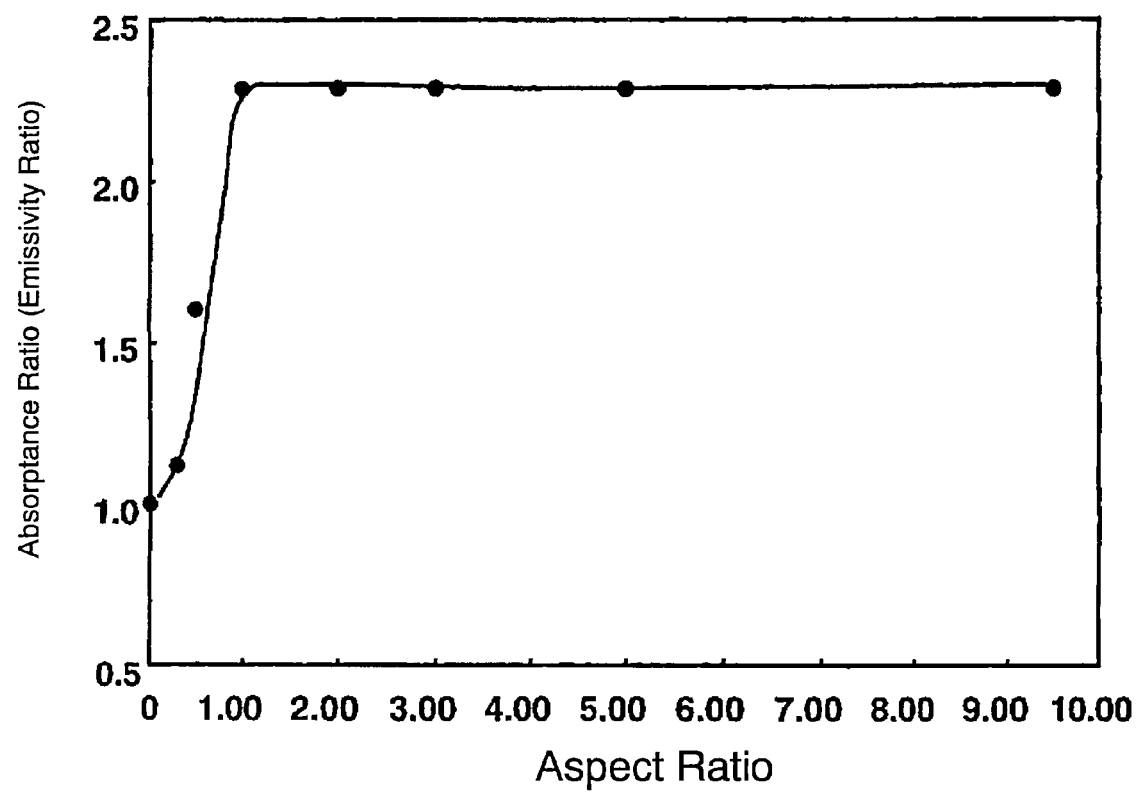
FIG. 10 shows the results of simulations representing how the absorptance ratio (or emissivity ratio) changes with the aspect ratio of the cavities.

FIG. 10 shows the results of simulations representing how the absorptance ratio (i.e., the ratio of the absorptance of the reflector with cavities to that of the reflector without cavities) changes with the aspect ratio of the cavities. In the range in which the aspect ratio is from zero through 1.00, the greater the aspect ratio, the higher the absorptance ratio. That is to say, it can be seen that as the aspect ratio increases, the reflectance decreases. This is because as the aspect ratio increases, the less likely the induced current flows onto the bottom of the cavities. Instead, more induced current will be concentrated on the edge portions surrounding the cavities, thus increasing the loss.

These results of simulations reveal that if the aspect ratio is equal to or greater than 1.00, the reflectance cannot be increased no matter how much the aspect ratio is increased. This is a completely new discovery that is quite different from the common misconception that the greater the cavity depth D of a waveguide, the greater cutoff effect the waveguide can achieve (i.e., the greater the aspect ratio, the more significantly infrared radiations can be reflected (or suppressed).

SUMMARY

As is clear from the results of experiments and simulations described above, it was proved that by setting the aspect ratio of cavities within the range of 0.17 to 0.70, the infrared reflection effect could be increased.

The reflective plate is preferably made of a metal. More particularly, the side and bottom surfaces of the cavities are preferably coated with a metal. This is because in that case, current flows through the bottom portion of the metallic cavities to further increase the reflectance when the reflective plate receives radiations (i.e., electromagnetic waves). The distance from the bottom of the cavities to the back surface of the reflective plate may be approximately equal to or greater than the skin depth of the material of the reflective plate.

Meanwhile, if the cavities physically penetrated the reflective plate from the surface through the bottom thereof or if the reflective plate were made of a material that is transparent to infrared rays (such as inorganic glass), then the reflective plate would have no reflection function. This is because no current would flow through the bottom of the cavities and would not increase the reflectance at all.

Hereinafter, preferred embodiments of a reflector according to the present invention will be described with reference to FIGS. 11 through 13.

Embodiment 1

Figure 11:
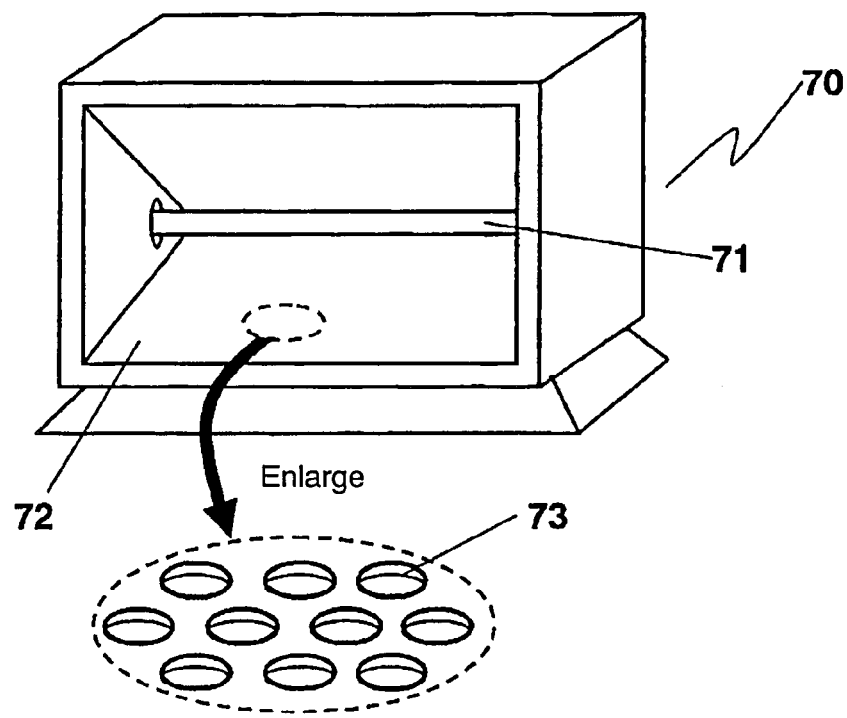
FIG. 11 schematically illustrates the configuration of a heater 70 according to a first preferred embodiment of the present invention.

FIG. 11 schematically illustrates the configuration of a heater 70 according to a first preferred embodiment of the present invention. The heater 70 includes a heating wire 71 and a reflective plate 72.

The heating wire 71 is a heat source. The reflective plate 72 is provided so as to reflect an infrared ray, radiated from the heating wire 71, outside of this heater 70, and may be made of steel, for example.

On the surface of the reflective plate 72, arranged are cavities 73, which include the cavities 21 of the cavity portion 11 shown in FIGS. 1(a), 2(a) and 2(b).

The heater 70 is used mainly to warm a human being. That is why the cavities 73 preferably have a diameter of approximately 3 μm. This is because the human skin absorbs radiations with wavelengths of 6 μm or more by nature. The depth of the cavities 73 is determined by the aspect ratio that should be set for the cavities 73. As described above, the cavities 73 preferably have an aspect ratio of 0.17 to 0.7. Therefore, the depth of the cavities 73 may be calculated as the product of a desired aspect ratio and the diameter of the cavities 73.

By arranging a plurality of cavities with an aspect ratio falling within that range on the reflective plate of the heater 70, the reflectance of infrared rays can be increased and infrared rays to warm the user can be reflected toward him or her more efficiently.

In this example, a reflective plate 72 for a heater that uses a heating wire 71 has been described. However, the present invention is in no way limited to this specific preferred embodiment. Alternatively, the present invention is also applicable to an infrared reflective plate for an oil space heater or gas space heater or an infrared reflective plate for a halogen heater. Furthermore, the present invention can also be used effectively as a reflective mirror for a heater to warm objects, not human beings. For example, the present invention may be used as a reflective mirror that is arranged around a heat source to heat the encapsulated portion of a lamp when the lamp is being encapsulated.

Embodiment 2

Figure 12:
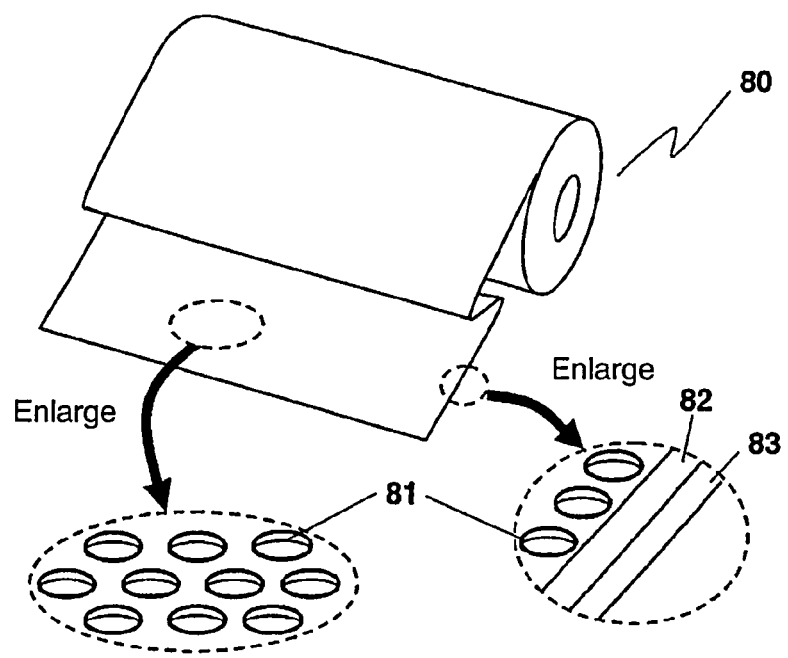
FIG. 12 schematically illustrates the configuration of a reflective sheet 80 according to a second preferred embodiment of the present invention.

FIG. 12 schematically illustrates the configuration of a reflective sheet 80 according to a second preferred embodiment of the present invention. This reflective sheet 80 has flexibility and is foldable. A roll of reflective sheet 80 that has been wound up is illustrated in FIG. 12 as an example.

The reflective sheet 80 is a stack of a reflective layer 82 and a resin layer 83. The reflective layer 82 defines the surface of the reflective sheet 80 and may be made of aluminum foil, for example. On the (reflective) surface of the reflective layer 82, arranged are a number of cavities 81, which have an aspect ratio of 0.7 or less. The lowest permissible aspect ratio is preferably 0.17. The foil may have any thickness as long as the thickness is greater than the skin depth of the foil material used and makes the sheet foldable in use. For example, the thickness is preferably in the range of 1 μm to 500 μm in practice.

The resin layer 83 is arranged behind the reflective layer 82 as a backing layer for the reflective layer 80. The resin layer 83 may be made of urethane, for example. The resin layer 83 has at least two functions. Specifically, the resin layer 83 functions not only as an adhesive member to fix the reflective sheet 80 at a predetermined position but also as a protective member for protecting the cavities 81 on the reflective layer 82.

In this preferred embodiment, the cavities 81 have a relatively small aspect ratio, and therefore, the reflective layer 82 can be formed easily by a press process. When the cavities 81 are made by a press process, the portions being extruded as the cavities 81 are being formed protrude from the back surface of the reflective layer 82. If the reflective sheet 80 in such a state is put on and attached to a wall, for example, then those protruding portions on the back surface of the reflective layer 82 are pushed back to possibly flatten the cavities 81 out in some cases. Thus, the resin layer 83 would function as a cushion member between the wall and the reflective layer 82 to prevent the cavities 81 from collapsing.

The reflective sheet 80 of this preferred embodiment achieves a higher infrared reflectance in a desired wavelength range than a reflective sheet with no cavities 81. In addition, since the reflective sheet 80 is backed with a resin portion, the cavities 81 never collapse when the reflective sheet 80 is attached to another member. Besides, as those cavities 81 with a small aspect ratio can be made easily by subjecting a metal sheet to a press process, the reflective sheets 80 can be mass-produced very easily.

The reflective sheet 80 of this preferred embodiment includes the adhesive resin layer 83 behind the reflective layer 82. However, the present invention is in no way limited to that specific preferred embodiment. For example, the reflective sheet 80 may also be used as a curtain fabric. If the reflective sheet 80 with cavities on the side to be exposed to sunrays is used as at least a portion of a curtain, then infrared rays from the sun can be reflected effectively, thus minimizing the increase in room temperature inside a house.

The reflective sheet 80 may also be attached to a car body. By attaching this reflective sheet 80 to the body of a car, infrared rays falling on the car can be reflected at high reflectance, thus minimizing increase in temperature inside the car effectively. Instead of attaching the reflective sheet 80 to a car body, the arrangement of cavities may be defined on the surface of the car body by subjecting the body surface itself to a press process. Alternatively, a metal sheet, on which those cavities have been made by a press process, may be formed into a car body shape.

As can be seen, the reflective sheet 80 does not have to include the resin layer 83. The reflective sheet 80 may either consist essentially of the reflective layer 82 or be combined with a member made of any other material.

Optionally, the reflective layer 82 may be backed with a resin layer until the cavities 81 are made on the reflective layer 82, and then the resin layer may be removed. Such use is effective in applications in which the reflective layer 82 does not have to be put on a wall.

In any of the examples described above, the surface of the reflective sheet or metal sheet with the cavities may be coated with inorganic glass or resin that is transparent to infrared rays. In that case, it is possible to prevent the sheet from deteriorating or the cavities from collapsing after machining, thus maintaining sufficient infrared ray reflecting effects.

Embodiment 3

Hereinafter, a preferred embodiment of a reflector to be exposed to more intense heat than the counterparts of the first and second preferred embodiments will be described.

In a conventional electric furnace, such as that disclosed in Japanese Patent Application Laid-Open Publication No. 8-14764, a metal such as gold is evaporated on the surface of a transparent glass enclosure that is arranged so as to surround a heat generator. And a layer of this evaporated metal reflects the thermal radiation of infrared rays back to the heat generator, thereby heating the object.

However, gold has a melting point of 1,064° C., and therefore, it is difficult to realize a furnace that can withstand the heat of more than 1,000° C. Besides, since gold is an expensive material, the furnace product itself should be expensive. Meanwhile, another electric furnace, disclosed in the same document, surrounds a heat source with a metallic wall of aluminum, for example, thereby reflecting the thermal radiation of infrared rays back to the heat source and keeping the object warm. However, even when aluminum is used to make the metallic wall, aluminum, having a melting point of 660° C., cannot be used, either, to make a furnace that needs to withstand the heat of 1,000° C. or more.

Figure 13:
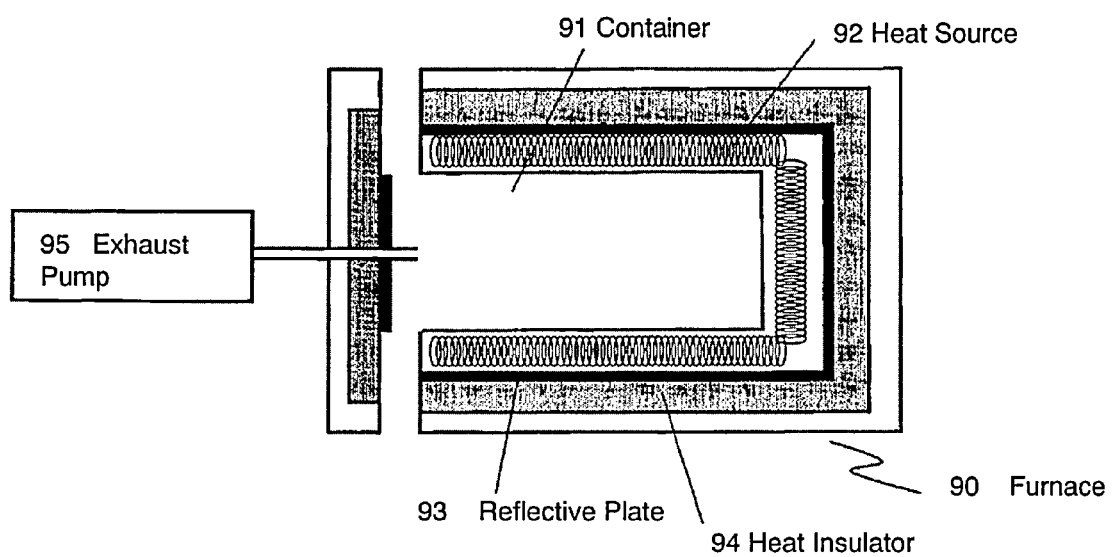
FIG. 13 illustrates the configuration of a furnace 90 according to a third preferred embodiment of the present invention.
Figure 14:
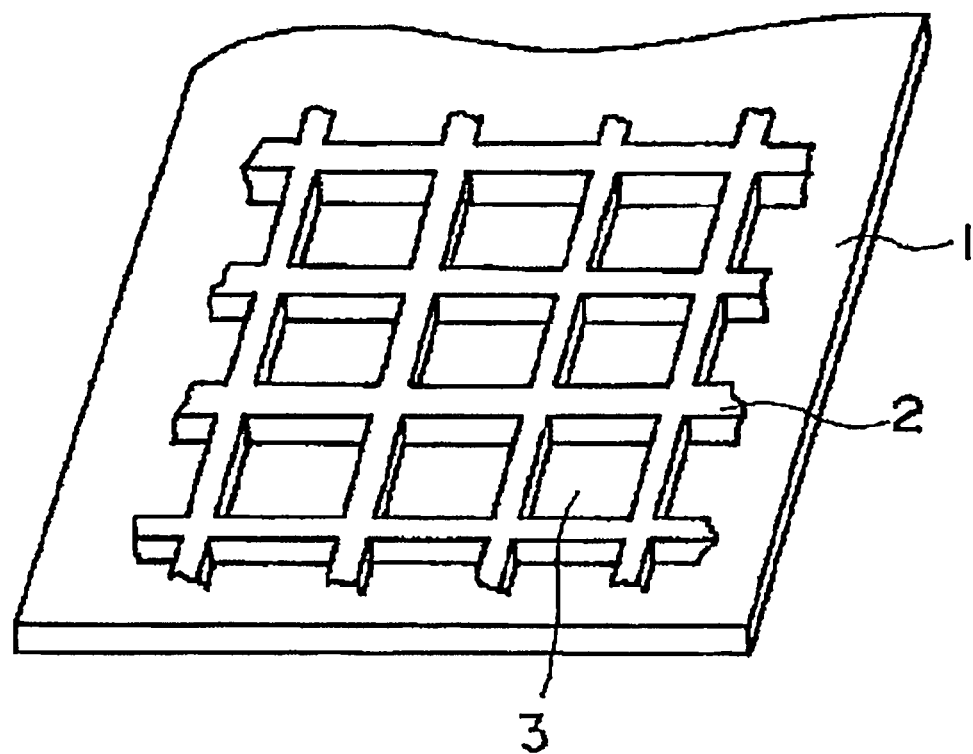
FIG. 14 illustrates the configuration of a conventional reflective structure.

FIG. 13 shows a configuration for a furnace 90 according to a third preferred embodiment of the present invention. The furnace 90 includes a container 91, a heat source 92, a reflective plate 93, a heat insulator 94 and an exhaust pump 95. The furnace 90 may be used to encapsulate a lamp, for example.

The container 91 is provided to receive an object to heat. The heat source 92 may be a heating wire to radiate heat, for example, and is arranged so as to surround the container 91.

The reflective plate 93 is arranged so as to reflect infrared rays, radiated from the heat source 92, and heat the object in the container 91, and may be made of tungsten, for example. Since tungsten is less expensive than gold and has a higher melting point than gold or aluminum, tungsten can be used more effectively to realize a reflective plate 93 that can withstand intense heat.

On the (reflective) surface of the reflective plate 93, arranged are a number of cavities. The reflective surface of the reflective plate 93 is opposed to the heat source 92 to reflect the infrared rays, radiated from the heat source, toward the container.

The reflective plate 93 needs to reflect at least infrared rays. For that purpose, the cavities on the reflective plate 93 should have a diameter that is smaller than a half of the wavelength of infrared rays to reflect and an aspect ratio of 0.17 to 0.7. For example, the cavities 22 of the cavity portion 14 shown in FIGS. 1(b), 5(a) and 5(b) are preferably made on the reflective plate 93.

The heat insulator 94 is arranged on the opposite side of the reflective plate 13 (i.e., so as to sandwich the reflective plate 93 between the heat source 92 and itself) to prevent the heat, generated from the heat source 92, from being dissipated to the outside air.

The exhaust pump 95 is connected to the cap of the furnace 90 to reduce the pressure inside the container 91.

By using the reflective plate 93 with a plurality of cavities to make the furnace 90, the infrared reflectance can be increased. As a result, the object can be heated quickly to, and maintained efficiently at, a selected temperature. In addition, since the reflective plate 93 is made of tungsten, which is less expensive than gold, a high-efficiency furnace is realized at a reduced cost.

The reflective plate (or reflector) of any of the preferred embodiments of the present invention described above may be replaced with the reflector to be described below.

Specifically, to use a reflective plate as a reflector and achieve its effect sufficiently, the cavities of the reflector need to keep their shape within the atmosphere in which the reflector is used.

The present inventors discovered that when the reflector was made of tungsten on which cavities with sizes of several μm or less had been arranged, those cavities collapsed in a short time at a temperature of approximately 1,200 K even though tungsten has a melting point of more than 3,000 K. In a furnace (heater) to encapsulate a lamp, for example, the temperature of the reflective plate may exceed 1,200 K. If the size of the cavity array structure is reduced to the order of several micrometers to increase the infrared reflectance but if the surface structure collapses eventually, such a reflector cannot be applied to an apparatus that should operate at elevated temperatures.

Thus, the present inventors discovered and confirmed via experiments that if a tungsten compound layer, including tungsten and carbon, was provided, the array of cavities could be stabilized thermally and their microcavity structure at the surface did not collapse but was maintained even at such elevated temperatures.

That is why in a reflector to be used in a high-temperature atmosphere, its tungsten layer may include a layer of a tungsten compound such as WC or $W_2C$ and the cavities may be made on the tungsten compound layer, thus preventing the cavities from collapsing in a short time. It is particularly preferable to use such a reflector as a reflective plate for the furnace of the third preferred embodiment described above.

The tungsten compound layer may be formed by subjecting the surface of a sample, having those cavities on the surface of the reflector of tungsten, to a plasma carburizing process. The carburizing process is a process for carbonizing the surface of a metal, for example, and may be carried out by any of various methods that have been developed so far. For example, according to a plasma carburizing process, using the furnace body or insulator as an anode and the workpiece as a cathode, respectively, a high DC voltage is applied between these electrodes in a rare gas atmosphere containing a hydrocarbon gas such as methane or propane, thereby generating glow discharge and eventually plasma. In the plasma, various electrochemical reactions set in to make ions of the hydrocarbon gas bombard on the surface of the workpiece and thereby produce carburizing. In a preferred embodiment, the carburizing process is preferably carried out at a temperature of 500° C. to 2,000° C. (e.g., at 1,100° C.) for 4 to 48 hours (e.g., for 8 hours).

By modifying the carburizing process conditions, the thickness of the resultant tungsten compound layer 16 can be controlled. To improve the thermal stability, it should be enough to deposit the tungsten compound layer 16 to a thickness of at least about several tens of nanometers.

However, the tungsten compound layer does not have to be made by such a carburizing process but may also be formed by introducing a constituent element of the compound, such as carbon, into tungsten by either ion implantation or solid-phase diffusion of carbon.

To reflect infrared rays with high efficiency, the cavities of the reflector of the present invention preferably have an inside diameter of 0.39 μm or more in practice. Also, to reflect visible radiation, a cavity inside diameter of 0.19 μm or more should be adopted in practice. However, as already described with reference to FIG. 4, the reflectance does not increase so steeply to the vicinity of 100% at a cutoff frequency. That is why the inside diameter is preferably less a half as long as the wavelength of the infrared rays to reflect. That is to say, the inside diameter of the cavities is determined by the desired wavelength and the desired reflectance. The cavities do not have to have a cylindrical shape but may also have a rectangular, polygonal or elliptical cross-sectional shape as viewed on a plane perpendicular to a normal to the reflective surface.

On the reflective surface, portions with no cavities are preferably flat but may have some unevenness if the unevenness is much smaller than the depth of the cavities.

INDUSTRIAL APPLICABILITY

The reflector of the present invention can reflect infrared rays at a higher reflectance, and therefore, can be used particularly effectively in a heating unit or heater to set the temperature efficiently or in a reflective sheet or any other apparatus that needs reflection.

The invention claimed is:

1. A reflector for reflecting infrared rays, comprising a reflective surface, the reflective surface having arranged thereon a plurality of cavities, wherein each said cavity has an aspect ratio of 0.17 to 0.7,
   wherein the reflective surface is configured to reflect infrared rays, and side and bottom surfaces of each said cavity are made of metal.

2. The reflector of claim 1, wherein each said cavity has a cylindrical shape, the aspect ratio of the cavity being figured out by dividing the depth of the cavity by the diameter thereof.

3. The reflector of claim 1, wherein at least the reflective surface of the reflector is made of a metal.

4. The reflector of claim 1, wherein the metal is tungsten or nickel.

5. The reflector of claim 1, wherein the reflector is a flexible sheet.

6. The reflector of claim 1, wherein a layer that defines the reflective surface is backed with a resin layer.

7. The reflector of claim 1, wherein the cavity has an aspect ratio of 0.3 to 0.4.

8. A furnace comprising
   a container,
   a heat source that surrounds the container, and
   the reflector of claim 1,
   wherein the reflective surface of the reflector is opposed to the heat source.

9. The furnace of claim 8, wherein the reflective surface reflects an infrared ray, radiated from the heat source, toward the container.

10. The furnace of claim 8, further comprising an exhaust pump that is connected to the container.

11. The furnace of claim 8, wherein the reflective surface of the reflector is a layer including tungsten and carbon.

12. The reflector of claim 1, wherein an interval between the cavities exceeds a skin depth δ (nm) of the metal, the skin depth δ (nm) being defined by the following Equation (1):

$$\delta = \lambda/4\pi\kappa \quad (1)$$

where $\lambda$ is a minimum wavelength (nm) of the infrared rays to be reflected by the reflective surface and $\kappa$ is an imaginary part of a complex permittivity of the metal.

\* \* \* \* \*